United States Patent
Lee et al.

(10) Patent No.: US 11,134,370 B2
(45) Date of Patent: Sep. 28, 2021

(54) INITIAL OPERATION METHOD FOR ROAMING TERMINAL ACCESSING NETWORK IN MOBILE COMMUNICATION ENVIRONMENT

(71) Applicant: Samsung Electronics Co., Ltd., Suwon-si (KR)

(72) Inventors: Hoyeon Lee, Seongnam-si (KR); Sunghoon Kim, Seoul (KR); Youngkyo Baek, Seoul (KR); Jungje Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 16/336,704

(22) PCT Filed: Sep. 27, 2017

(86) PCT No.: PCT/KR2017/010674
§ 371 (c)(1),
(2) Date: Mar. 26, 2019

(87) PCT Pub. No.: WO2018/066870
PCT Pub. Date: Apr. 12, 2018

(65) Prior Publication Data
US 2020/0404479 A1    Dec. 24, 2020

(30) Foreign Application Priority Data

Oct. 6, 2016    (KR) ........................ 10-2016-0129297

(51) Int. Cl.
*H04W 8/06*      (2009.01)
*H04W 28/24*     (2009.01)
*H04W 60/00*     (2009.01)

(52) U.S. Cl.
CPC ............. *H04W 8/06* (2013.01); *H04W 28/24* (2013.01); *H04W 60/00* (2013.01)

(58) Field of Classification Search
CPC ..... H04W 4/02; H04W 8/22; H04W 36/0022; H04W 36/0094; H04W 36/14;
(Continued)

(56) References Cited

U.S. PATENT DOCUMENTS 6,725,036 B1 *   4/2004   Faccin .................. H04L 63/104
                                                              379/15.02
2008/0039078 A1   2/2008   Xu et al.
(Continued)

FOREIGN PATENT DOCUMENTS

EP           2405629 A1 *   1/2012   ............. H04L 67/18
KR     10-2007-0112054 A    11/2007

OTHER PUBLICATIONS

"The Evolved Packet Core" by 3GPP, retrieved on Aug. 16, 2016 from https://web.archive.org/web/20160816233357/https://www.3gpp.org/technologies/keywords-acronyms/100-the-evolved-packet-core (Year: 2016).*

*Primary Examiner* — Daniel Lai
(74) *Attorney, Agent, or Firm* — Jefferson IP Law, LLP

(57) ABSTRACT

The present disclosure relates to a communication technique for converging, with an IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail businesses, and security and safety related services, on the basis of 5G communication technologies and IoT-related technologies. The present invention suggests a method for providing service information that a roaming terminal seeks (Continued)

to use in an initial access process of the roaming terminal accessing a visited network.

12 Claims, 10 Drawing Sheets

(58) Field of Classification Search
CPC ......... H04W 8/06; H04W 8/08; H04W 28/24; H04W 60/00; H04W 8/20; H04W 48/18; H04W 48/16; H04W 84/042; H04W 4/50; H04W 76/11; H04W 88/06; H04W 8/18; H04W 24/02; H04W 76/12; H04W 72/042; H04W 48/02; H04W 8/02; H04W 8/04; H04W 24/04; H04W 8/12; H04W 8/186; H04W 8/205; H04W 8/24; H04W 4/90; H04W 88/18; H04W 8/183; H04W 8/245; H04W 4/60; H04W 72/0406; H04W 72/0493; H04L 41/5006; H04L 41/5029; H04L 41/5054; H04L 67/16; H04L 41/5019; H04L 41/5022; H04L 41/5051; H04L 47/2425; H04L 47/2475; H04L 47/803; H04L 12/1485; H04L 47/808; H04M 15/8038; H04M 15/50
See application file for complete search history.

(56) References Cited

U.S. PATENT DOCUMENTS

| | | |
|---|---|---|
| 2009/0031394 A1 | 1/2009 | Kavanagh et al. |
| 2010/0167724 A1 | 7/2010 | Haran et al. |
| 2012/0184271 A1 | 7/2012 | Faccin et al. |
| 2013/0012165 A1* | 1/2013 | Popovich ............... H04L 63/08 455/411 |
| 2013/0267225 A1 | 10/2013 | Paredes |
| 2016/0066175 A1* | 3/2016 | Wang ..................... H04W 8/02 455/432.1 |
| 2019/0021043 A1* | 1/2019 | Youn ................. H04W 36/0055 |
| 2019/0037398 A1* | 1/2019 | Eriksson ............... H04W 12/00 |
| 2019/0159117 A1* | 5/2019 | Kuge ................. H04W 36/0022 |
| 2019/0159119 A1* | 5/2019 | Djordjevic .............. H04W 8/18 |
| 2019/0191367 A1* | 6/2019 | Ni ....................... H04L 63/0876 |
| 2020/0029273 A1* | 1/2020 | Shimojou ............. H04W 48/18 |

* cited by examiner

FIG. 2

| Roaming Level Index | Service Types | |
|---|---|---|
| Roaming Level 1 | HPLMNServiceType 1 | ~205 |
| | | ~210 |
| Roaming Level 2 | HPLMNServiceType 1, HPLMNServiceType 2 | ~215 |
| Roaming Level 3 | HPLMNServiceType 1, HPLMNServiceType 2, HPLMNServiceType 3 | ~220 |

FIG. 3

| PLMM ID | Roaming Level Index | |
|---|---|---|
| HPLMN_ID | Roaming Level 1 | ~305 |
| HPLMN_ID | Roaming Level 2 | ~310 |
| HPLMN_ID | Roaming Level 3 | ~315 |
|  |  | ~320 |

FIG. 4

| Service Type (405) | Service Type in HPLMN (435) | Service Type in VPLMN (465) |
|---|---|---|
| Service A (410) | CommonServiceType 1 (440) | CommonServiceType 1 (470) |
| Service B (415) | HPLMNServiceType 1 (445) | VPLMNServiceType 3 (475) |
| Service C (420) | HPLMNServiceType 2 (450) | VPLMNServiceType 2 (480) |
| Service D (425) | HPLMNServiceType 3 (455) | - (485) |
| Service E (430) | - (460) | VPLMNServiceType 1 (490) |

INITIAL OPERATION METHOD FOR ROAMING TERMINAL ACCESSING NETWORK IN MOBILE COMMUNICATION ENVIRONMENT

TECHNICAL FIELD

The present invention proposes a method for a roaming terminal that wants to use a service to provide a visited network with information on the service in an initial attach procedure.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

In a 5G mobile communication system, a terminal may connect to a network with information on the services to use.

DISCLOSURE

Technical Problem

Because a terminal that attempts to connect to a visited network has no information about services supported by the visited network, a problem may arise in that which service information should be required when accessing the visited network. Service descriptions may differ between a home network and a visited network, which may cause another problem. The present invention proposes a method for solving the above problems.

Technical Solution

In accordance with an aspect of the present invention, a network attachment method of a terminal in a mobile communication system includes transmitting an attach request message including roaming level information mapped to at least one service type that the terminal can receive to a visited network (PLMN) and receiving, if the visited network receives first service type information determined based on a service level agreement made for providing subscribers of the visited network and a home network (PLMN) with a roaming service and the roaming level information from the home network, an attach response message including second service type information corresponding to the first service type information from the visited network.

Preferably, the roaming level information is one of multiple roaming level indices mapped to combinations of multiple service types that the terminal can receive. Preferably, the mapping information between the combinations of the multiple service types and the multiple roaming level indices is stored in the terminal in advance.

Preferably, the attach request message further includes a terminal identifier.

Preferably, the first service type information relates to a service type that the home network can provide for the terminal based on the service level agreement and the roaming level information, and the second service type information relates to a service type corresponding to the first service type information, which the visited network can provide for the terminal.

In accordance with another aspect of the present invention, a network attachment control method of a visited network (PLMN) in a mobile communication system includes receiving an attach request message including roaming level information mapped to at least one service type that a terminal can receive from the terminal, receiving first service type information determined based on a service level agreement made for providing subscribers of the visited network and a home network (PLMN) with a roaming service and the roaming level information from the home network from the home network, and transmitting an attach response message including second service type information corresponding to the first service type information to the terminal.

Preferably, the method further includes transmitting a service request message including the roaming level information and a terminal identifier to the home network.

Preferably, the roaming level information is one of multiple roaming level indices mapped to combinations of multiple service types that the terminal can receive.

Preferably, the first service type information relates to a service type that the home network can provide for the terminal based on the service level agreement and the roaming level information, and the second service type information relates to a service type corresponding to the first service type information, which the visited network can provide for the terminal.

In accordance with another aspect of the present invention, a network attachment control method of a home network (PLMN) in a mobile communication system includes receiving a service request message from a visited network (PLMN), the service request message including roaming level information mapped to at least one service type that a terminal can receive and a terminal identifier of the terminal, determining first service type information based on a service level agreement made for providing subscribers of the visited network and a home network (PLMN) with a roaming service and the roaming level information, and transmitting a service response message including the first service type information to the visited network.

Preferably, determining the first service type information includes ascertaining subscriber information based on the terminal identifier and determining the first service type information based on the service level agreement, the roaming level information, and the subscriber information.

Preferably, mapping information between combinations of multiple service types and the roaming level information is stored in the home network in advance.

In accordance with another aspect of the present invention, a terminal attaching to a network in a mobile communication system includes a transceiver configured to transmit and receive signals and a controller connected to the transceiver and configured to control the transceiver to transmit an attach request message to a visited network (PLMN), the attach request message including roaming level information mapped to at least one service type that the terminal can receive, and receive, if the visited network receives first service type information determined based on a service level agreement made for providing subscribers of the visited network and a home network (PLMN) with a roaming service and the roaming level information from the home network, an attach response message including second service type information corresponding to the first service type information from the visited network.

In accordance with another aspect of the present invention, a visited network (PLMN) for controlling a network attachment in a mobile communication system includes a transceiver configured to transmit and receive signals and a controller connected to the transceiver and configured to control the transceiver to receive an attach request message including roaming level information mapped to at least one service type that a terminal can receive from the terminal, receive first service type information determined based on a service level agreement made for providing subscribers of the visited network and a home network (PLMN) with a roaming service and the roaming level information from the home network from the home network, and transmit an attach response message including second service type information corresponding to the first service type information to the terminal.

In accordance with still another aspect of the present invention, a home network (PLMN) for controlling a network attachment in a mobile communication system includes a transceiver configured to transmit and receive signals and a controller connected to the transceiver and configured to control the transceiver to receive a service request message from a visited network (PLMN), the service request message including roaming level information mapped to at least one service type that a terminal can receive and a terminal identifier of the terminal, determine first service type information based on a service level agreement made for providing subscribers of the visited network and a home network (PLMN) with a roaming service and the roaming level information, and control the transceiver to transmit a service response message including the first service type information to the visited network.

Advantageous Effects

The present invention is advantageous in terms of making it possible, in an initial attach procedure, for a roaming terminal to request for a service it wants to use in a wireless communication system. The present invention is also advantageous in terms of facilitating management of service information when a terminal is roaming to a visited network in a situation where the same service is defined as a different type of service in a mobile communication system. The present invention is also advantageous in terms of providing a roaming service efficiently in a 5G mobile communication environment through the above features.

DESCRIPTION OF DRAWINGS

FIG. 2 is a diagram illustrating roaming service subscription information according to an embodiment of the present invention;

FIG. 3 is a diagram illustrating roaming service description information being requested by a roaming UE attempting an initial attach to a VPLMN according to an embodiment of the present invention;

FIG. 4 is a diagram illustrating services provided by mobile communication operators and an exemplary service level agreement made between mobile communication operators;

MODE FOR INVENTION

Figure 1:
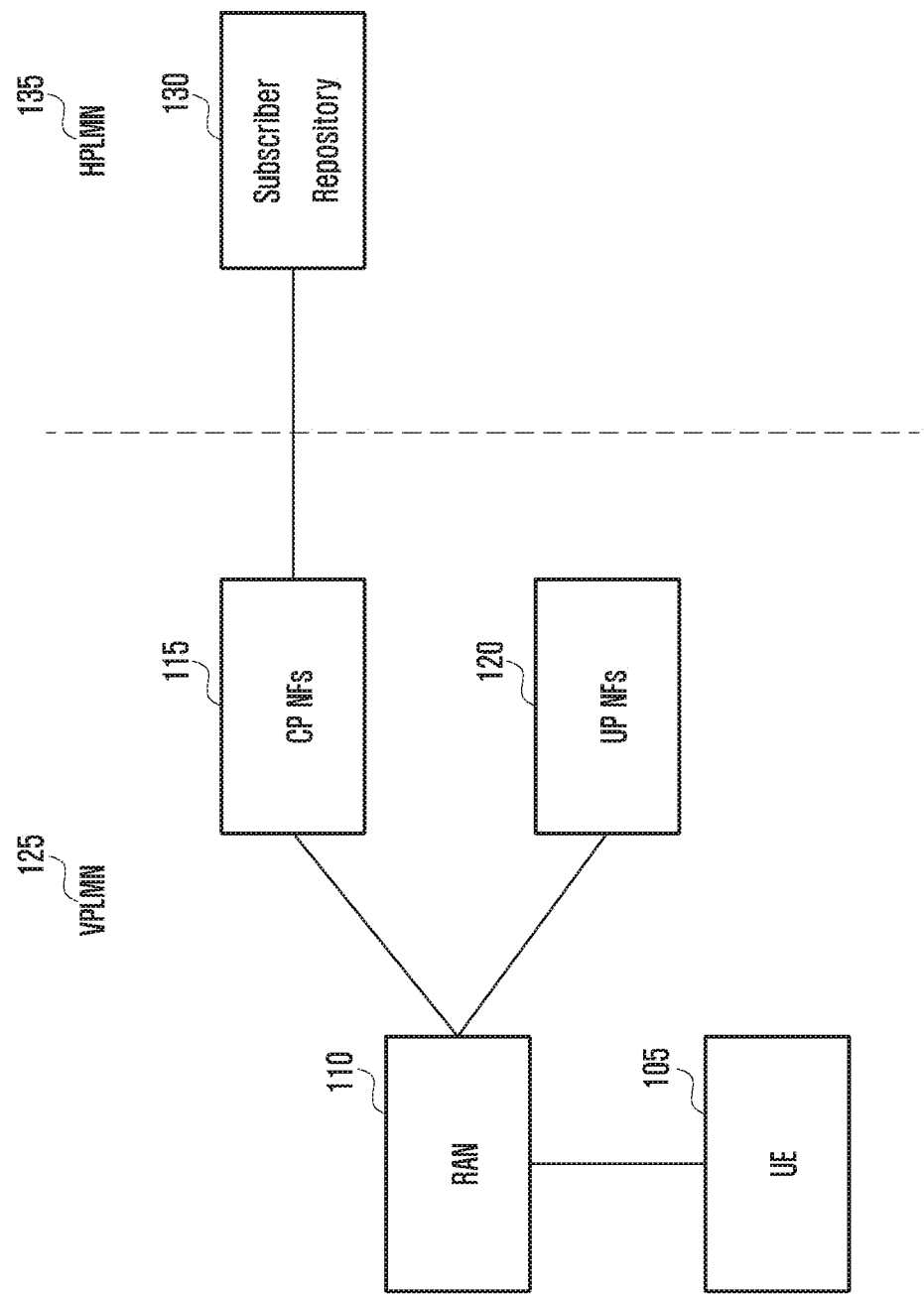
FIG. 1 is a diagram illustrating a roaming architecture according to an embodiment of the present invention.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

The present invention proposes a method for providing service information that a roaming terminal wants to use in an initial attach procedure of the roaming terminal connected to a visited network. A detailed description thereof is made hereinafter.

FIG. 1 is a diagram illustrating a roaming architecture. A terminal (user equipment (UE)) 105 registered with its home PLMN (HPLMN) 135 is located in a visited PLMN (VPLMN) 125. The HPLMN 135 and the VPLMN 125 are mobile communication operators having a roaming agreement therebetween; a control plane network function (CP NF) 115 of the VPLMN 125 connects to a subscriber information storage (subscriber repository) 130 of the HPLMN 135 to inquire subscriber information of the UE 105. The CP NF 115 is responsible for mobility management (MM) or session management (SM).

In this embodiment, for convenience of explanation, it is assumed that the UE 105 is registered with the HPLMN 135 and is capable of receiving three types of services provided by the HPLMN 135. The three types of services are referred to as HPLMNSeriviceType1, HPLMNSeriviceType2, and HPLMNSeriviceType3. For example, HPLMNServiceType1 may be a voice call service, HPLMNServiceType2 a broadband Internet service, and PLMNServiceType3 an IoT service.

FIG. 2 is a diagram illustrating a table listing roaming information for providing a subscriber UE with a roaming service.

In reference to FIGS. 1 and 2, the HPLMN 135 and the UE 105 may define roaming level index based on a combination (group) of at least one of the three service types that could be provided to the UE 105. For example, roaming level 1 covers HPLMNServiceType1 as denoted by reference number 210, roaming level 2 covers HPLMNService-Type 1 and HPLMNServiceType2 as denoted by reference number 215, and roaming level 3 covers HPLMNSerivice-Type1, HPLMNSeriviceType2, and HPLMNSeriviceType3 as denoted by reference number 220.

The service types mapped to each roaming level may vary according to subscription information of UE 105, network management of the home PLMN 135, and a request from the UE 105. The roaming information depicted in FIG. 2 is stored in the UE 105 and the subscriber repository 130 of the HPLMN 135.

The term "service type" used in the present invention may be replaced by another term. For example, the term "service type" may be replaced (substituted) by "slice type", "network slice type", "slice instance", "network slice instance", "service usage", "service capability", or the like.

A brief description is made of a procedure for accessing the HPLMN 135 before beginning the explanation of the present invention. The UE 105 has to perform an initial attach procedure for use of a mobile communication service for which the UE 105 generates an initial attach message. The initial attach message is delivered to CP NFs of the HPLMN 135, and the CP NFs process the corresponding message to complete the attachment of the UE 105. Here, the UE may include the service type information in the initial attach message, the service type information indicating the service that the UE 105 wants to use. For example, the UE may generate the initial attach message including the information indicating that it wants to use three types of services (i.e., HPLMNSeriviceType1, HPLMNSeriviceType2, and HPLMNSeriviceType3).

The embodiments of the present invention are directed to cases where the UE 105 attaches to the visited network 125. The UE 105 may initiate an initial attach procedure for use of a mobile communication service by generating and transmitting an initial attach message.

In reference to FIGS. 1 and 2, the UE may recognize that it is located in the visited PLMN 125 rather than in the HPLMN 135. The UE may recognize its location in the VPLMN 125 based on a message transmitted by a RAN 110 of the VPLMN 125. Upon recognition of its location in the VPLMN 125, the UE may generate an initial attach message different in configuration from that generated in the HPLMN 135.

In more detail, the UE may generate the initial attach message with or without an indication about services it wants to use. According to an embodiment, the UE may generate the initial attach message including only a roaming level index rather than the indication about the services it wants to use, the roaming level index being selected based on the roaming information stored in the UE (FIG. 2).

FIG. 3 is a diagram illustrating a table listing information included in an initial attach message being transmitted by a UE in attaching to a visited PLMN. In reference to FIG. 3, the UE may generate the initial attach message including an ID of the HPLMN 135 (HPLMN ID) and a roaming level index determined based on the roaming information (FIG. 2) stored in the UE instead of a description of the services it wants to use.

For example, if the UE wants to use all of the three types of services (i.e., HPLMNSeriviceType1, HPLMNSerivice-Type2, and HPLMNSeriviceType3), it may generate the initial attach message including the ID of its HPLMN 135 and the roaming level 3 as denoted by reference number 320 based on the information of FIG. 3 that is stored in the UE. How the initial attach message transmitted by the UE is handled by the VPLMN is described with reference to FIG. 5. The information of FIG. 3 may be included (or used) in other control signaling messages such as a PDN connection setup message and a service request message in addition to the initial attach message.

FIG. 4 is a diagram illustrating a table listing services provided by a HPLMN and a VPLMN according to an embodiment of the present invention.

In reference to FIGS. 1 to 4, the HPLMN 135 may be able to provide its subscriber's UE with Service A 410, Service B 415, Service C 420, and Service D 425. The per-subscriber's UE services of the HPLMN may vary according to subscription information. For example, subscriber 1 may be able to use all of the 4 services being provided by the HPLMN based on the subscription information of subscriber 1, and subscriber 2 may be able to use some (e.g., Service A 410 and Service C 420) of the services being provided by the HPLMN based on the subscription information of subscriber 2.

Service A 410 may be classified as CommonServiceType 440 that is used in common all over the world. The HPLMN may classify Service B 415 as HPLMNServiceType1 445, Service C 420 as HPLMNServiceType2 450, and Service D 425 as HPLMNServiceType3 455.

Meanwhile, the VPLMN 125 may be able to provide its subscriber's UEs with Service A 410, Service B 415, Service C 420, and Service E 430. The per-subscriber's UE services of the VPLMN may vary according to subscription information.

Service A 410 may be defined as CommonServiceType 440 as a service type in use commonly all over the world. That is, Service A 510 may be identically defined as CommonServiceType1 in all mobile communication operators as denoted by reference numbers 440 and 470.

The VPLMN may classify Service B 415 as VPLMNServiceType3 475, Service C 420 as VPLMNServiceType2 480, and Service E 430 as VPLMNServiceType1 490.

The HPLMN 135 and the VPLMN 125 may make a service level agreement (SLA) for providing their subscribers with a roaming service. For convenience of explanation, it may be assumed that the HPLMN 135 and the VPLMN 125 make an SLA for providing Service A 410, Service B 415, and Service C 420. As shown in FIG. 4, the HPLMN and the VPLMN may classify a service as a different service type.

Figure 5:
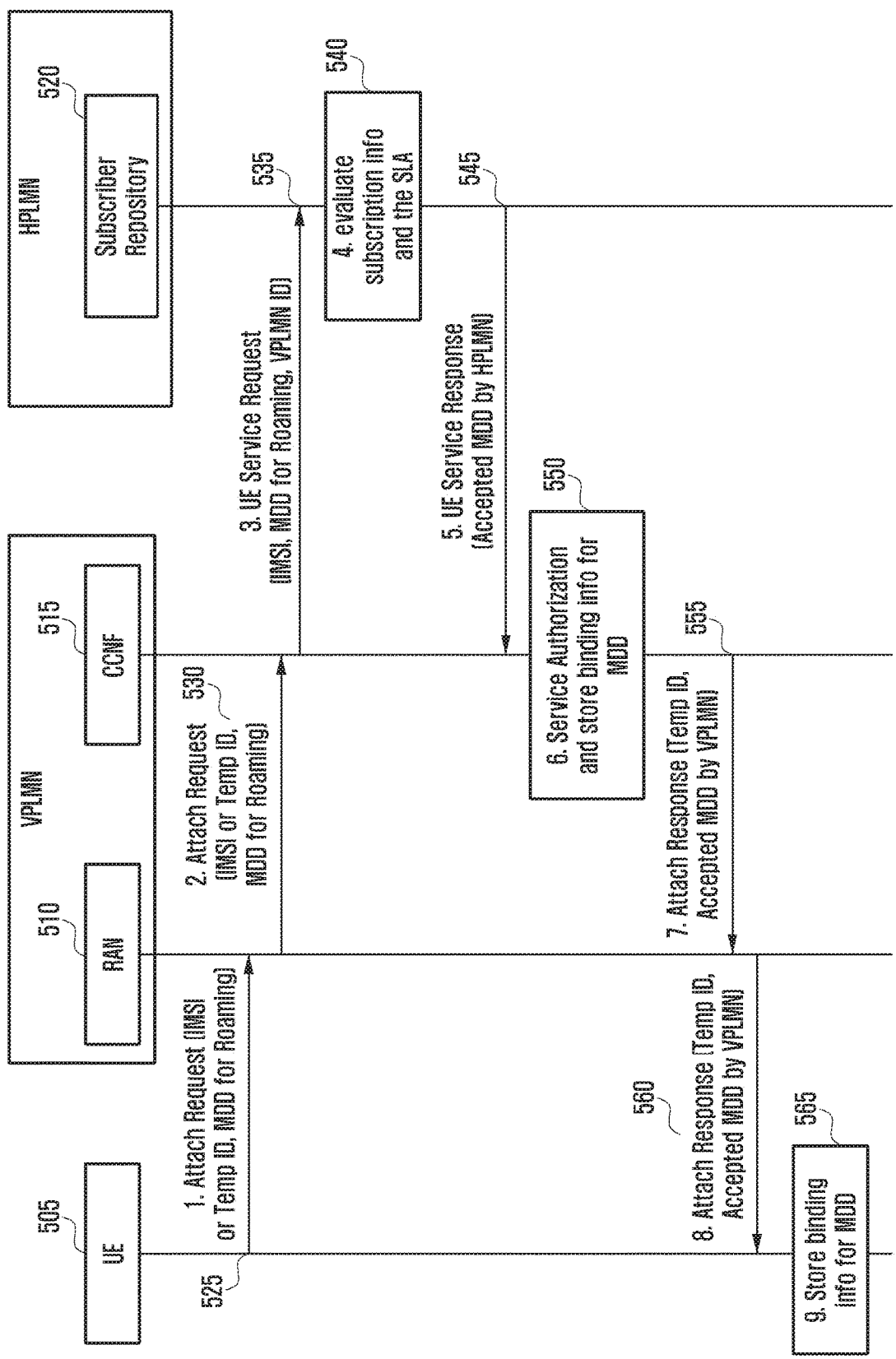
FIG. 5 is a signal flow diagram illustrating an initial attach procedure in a VPLMN according to an embodiment of the present invention.

FIG. 5 is a signal flow diagram illustrating a procedure of processing an initial attach message for use by a UE to attach to a visited PLMN according to an embodiment of the present invention.

In reference to FIG. 5, the UE 505 may recognize that it is located in a VPLMN. Upon recognition of its location in the VPLMN, the UE 505 may generate an initial attach message different in configuration from that for use in its HPLMN. That is, the UE 505 may generate the initial message including a roaming index as described with reference to FIG. 3 instead of the services it wants.

After generating the initial attach message, the UE 505 may transmit the initial attach message to an RAN 510 of the VPLMN at step 525. The initial attach message may include a UE identifier (IMSI or Temp ID) and "MDD for roaming" indicative of roaming level index information. The "MDD for roaming" may include only the desired roaming level index information along with or without an HPLMN ID. The initial attach message may be referred to as attach request message as in FIG. 5.

For convenience of explanation, it is assumed that the initial attach message includes roaming level index 3 as denoted by reference number 320 in FIGS. 2 and 3. Upon receipt of the initial attach message at step 525, the RAN 510 may notice that the UE 505 is a roaming UE based on the "MDD for roaming". The RAN 510 may forward the initial attach message to a CCNF 515 of the VPLMN at step 530, the CCNF corresponding to the CP NF 115 in FIG. 1. The initial attach message may be referred to as attach request message as in FIG. 5.

The CCNF 515 may be responsible for a mobility management (MM) function or include a network function (NF) in charge of mobility management. Upon receipt of the initial attach message, the CCNF 515 checks the "MDD for roaming" included in the initial attach message for the HPLMN ID of the UE 505 and the roaming level index information requested by the UE.

The CCNF 515 may check the PLMN ID of a subscription permanent identifier (SUPI) of the UE 505 to acquire the HPLMN ID of the UE 505. It may also be possible to acquire the HPLMN ID from the initial attach message transmitted by the UE.

The CCNF 515 is unlikely to know the service types corresponding to the roaming level index received from the UE because the CCNF 515 is a node belonging to the VPLMN.

The CCNF 515 may transmit a UE service request message to a subscriber repository 520 (130 in FIG. 1) of the HPLMN at step 535. The UE service request message may include an ID (IMSI) of the UE 505, "MDD for roaming" indicative of roaming level index information requested by the UE 505, and an ID of the VPLMN (VPLMN ID).

Upon receipt of the UE service request message, the subscriber repository 520 of the HPLMN may processes the corresponding message at step 540. The subscriber repository 520 first performs authentication on the UE 505. If the UE authentication succeeds, the subscriber repository 520 analyzes the subscription information of the UE 505 and the SLA made with the VPLMN. For example, the subscriber repository 520 may derive the services corresponding to the roaming level index 3 320 from the information depicted in FIG. 2 because the UE 505 has made the roaming level index information request with the roaming level index 3. In reference to FIG. 2, the service types corresponding to the roaming level index 3 320 include HPLMNServiceType1, HPLMNServiceType2, and HPLMNServiceType3.

The subscriber repository 520 checks the SLA for determining whether the VPLMN (VPLMN ID) supports the three types of service (i.e., HPLMNServiceType1, HPLMNServiceType2, and HPLMNServiceType3) based on the information of FIG. 4. Through this, it is known that only two types of service (i.e., HPLMNServiceType1 and HPLMNServiceType2) are available in the VPLMN, even though the UE has requested three types of service.

The subscriber repository 520 may transmit a UE service response message to the CCNF 515 at step 545. The UE service response message may include information indicative of the service types (i.e., HPLMNServiceType1 and HPLMNServiceType2) available in the VPLMN among the service types the UE has requested. In FIG. 5, this information is expressed as "Accepted MDD by HPLMN" as denoted by reference number 545.

Furthermore, the subscriber repository 520 may notify the CCNF 515 that HPLMNServiceType1 and HPLMNServiceType2 correspond to VPLMNServiceType3 and VPLMNServiceType2 of the VPLMN respectively.

Upon receipt of the UE service response message, the CCNF 515 ascertains again that VPLMNServiceType3 and VPLMNServiceType2 are available in the current VPLMN and stores the binding information of the corresponding services at step 550.

At step 555, the CCNF 515 may transmit to the RAN 510 an attach response message including the service types accepted through the service authentication process (Accepted MDD by VPLMN) and the UE identifier (Temp ID).

Upon receipt of the attach response message, the RAN 510 is aware that two service types (i.e., VPLMNService- Type3 and VPLMNServiceType2) are provided to the UE 505. The RAN 510 may transmit the attach response message to the UE 505 at step 560. Upon receipt of the attach response message, the UE 505 becomes aware that the services provided by the VPLMN are HPLMNServiceType1 and HPLMNServiceType2 and stores the corresponding mapping information at step 565.

According to an alternative embodiment, the UE 505 that has recognized its location in a VPLMN may generate the initial attach message at step 525 without including any service request-related information. That is, the initial attach message may not include "MDD for roaming". The CCNF 515 that received the corresponding message, at step 530, via the RAN 510 may include no "MDD for roaming" information or configure a random value in the UE service request message being transmitted at step 535 to the subscriber repository 520 because the initial attach message does not include "MDD for roaming" information. If no "MDD for roaming" information is included in the UE service request message, the subscriber repository 520 transmits, at step 545, the UE service response message configured based on the information on all services subscribed by the UE 505 because there is no roaming level index information. That is, if the UE service request message does not include "MDD for roaming" information, the subscriber repository 520 may transmit, at step 545, the UE service response message including "Accepted MDD by HPLMN" describing as many service types as are available for the UE in the VPLMN based on all services subscribed by the UE 505 and the SLA made with the VPLMN.

Figure 6:
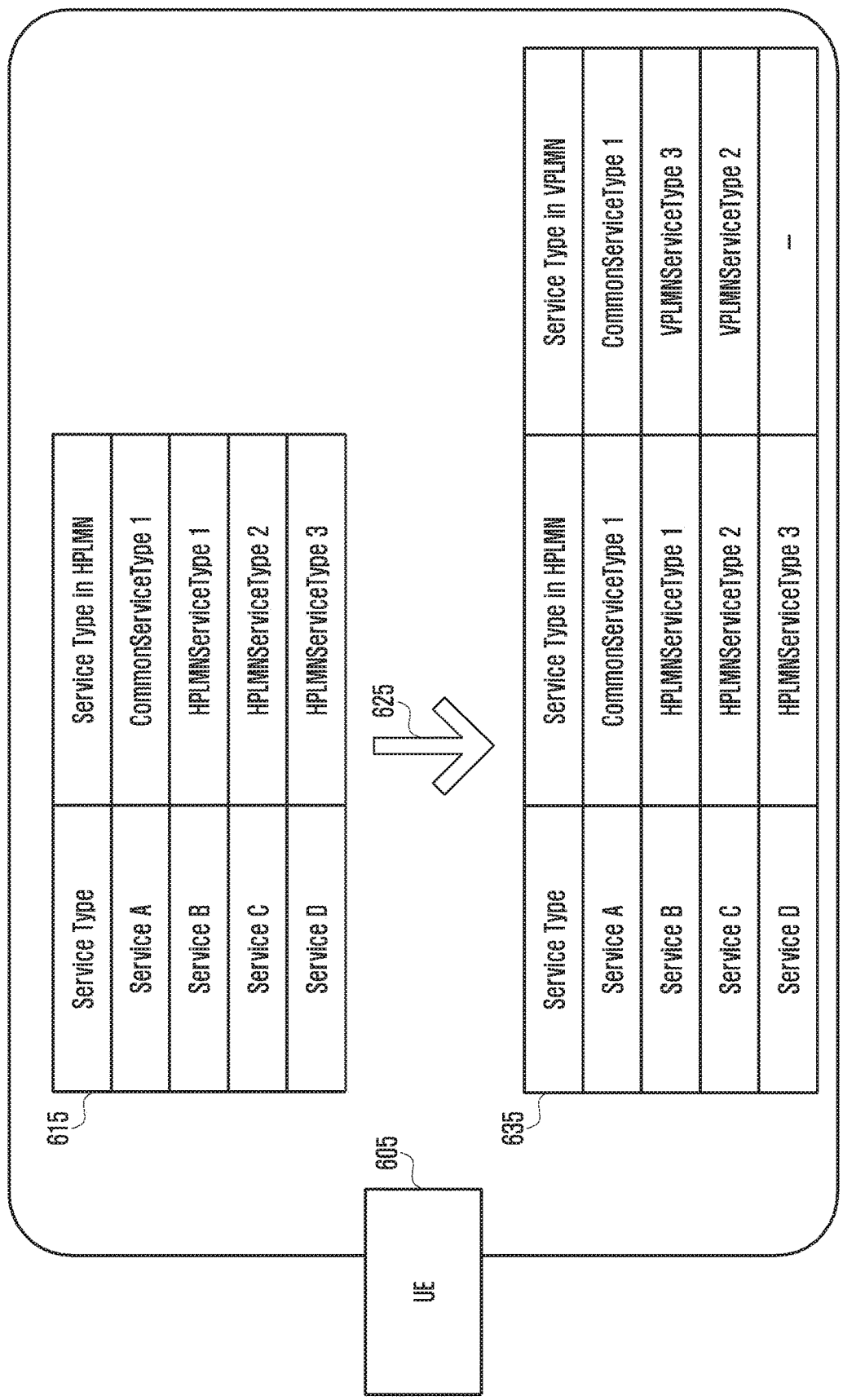
FIG. 6 is a diagram illustrating a change in information stored in a UE according to an embodiment of the present invention.

FIG. 6 is a diagram illustrating a change in information stored in a UE according to an embodiment of the present invention. In reference to FIGS. 1 to 6, the UE 605 has only the information 615 that is provided by its HPLMN. Afterward, the UE receives an attach response message 560 and stores, at step 565, mapping information 635 acquired by processing the attach response message. That is, the UE 605 becomes aware of the necessity of indicating VPLMNServiceType3 instead of HPLMNServiceType1 defined in the HPLMN in order to receive Service B in the VPLMN and after that it generates signaling messages with the service type information defined in the VPLMN.

Figure 7:
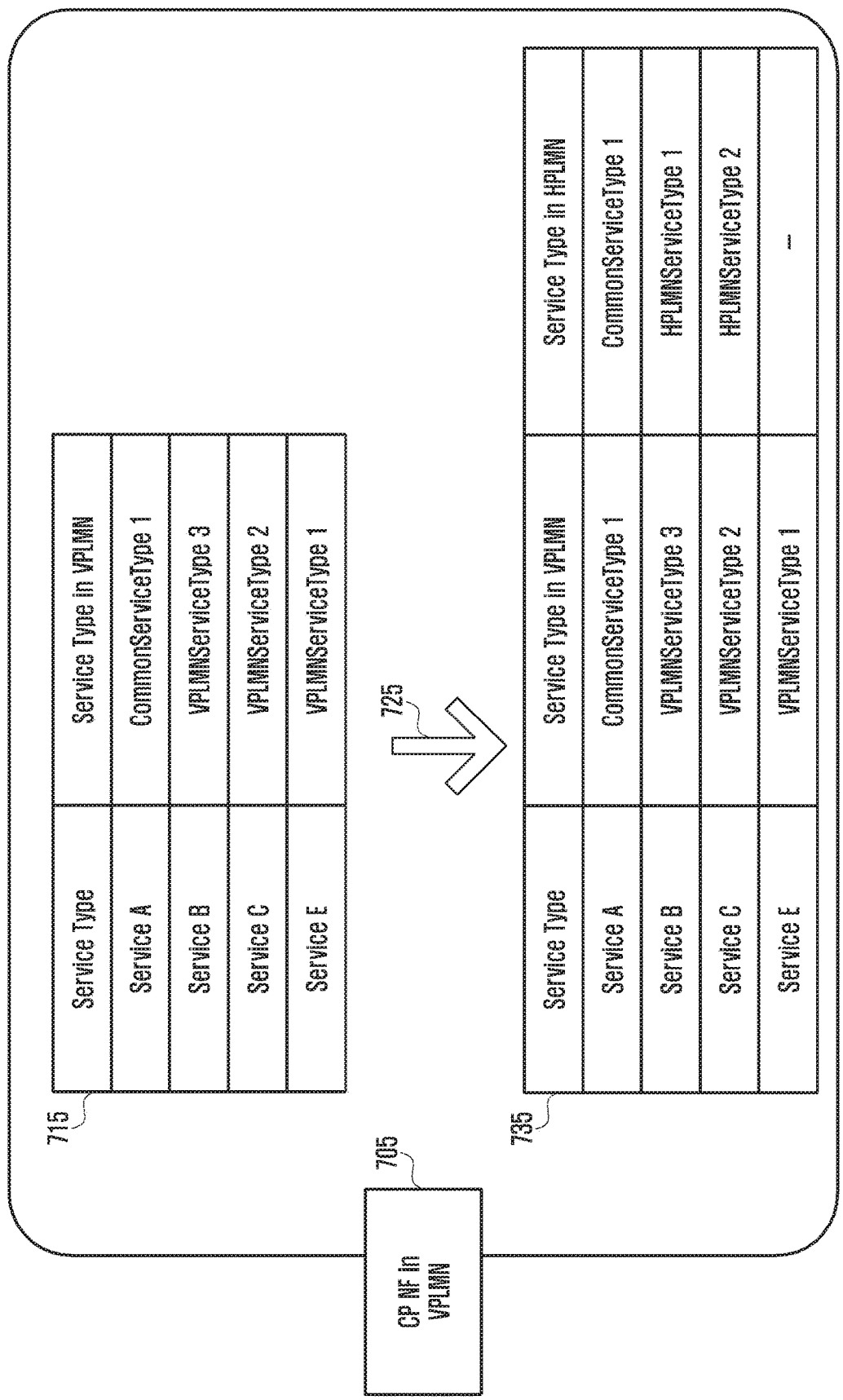
FIG. 7 is a diagram illustrating a change in information stored in a CCNF of a VPLMN according to an embodiment of the present invention.

FIG. 7 is a diagram illustrating a change in information stored in a CCNF. The CCNF 705 (CCNF 515 in FIG. 5) has only the information 715 that is provided by the VPLMN. Afterward, the CCNF receives a UE service response message and stores mapping information 735 acquired by processing the UE service response message at step 505. In FIG. 7, the CP NF 705 may be responsible for a mobility management (MM) function or include a network function (NF) in charge of MM.

According to an embodiment of the present invention, a service type that is common in several mobile communication operators (such as Service A 410 as denoted by reference number 440 and 470 in FIG. 4) can be used without any mapping.

Figure 8:
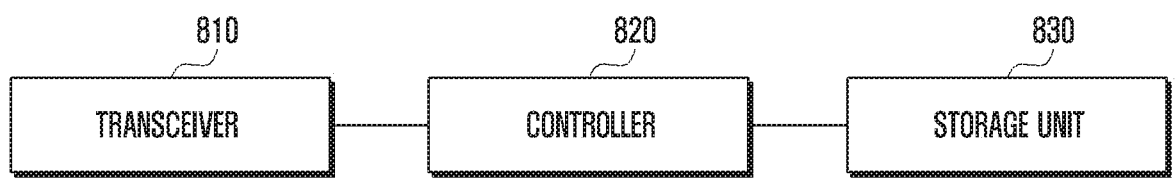
FIG. 8 is a block diagram illustrating a configuration of a UE according to an embodiment of the present invention.

FIG. 8 is a block diagram illustrating a configuration of a UE according to an embodiment of the present invention.

In reference to FIG. 8, the UE may include a transceiver 810, a controller 820, and a storage unit 830. In the present invention, the controller may be defined as a circuit, an application-specific integrated circuit, or at least one processor.

The transceiver 810 may transmit/receive signals to and from other network entities.

The controller 820 may control overall operations of the UE according to embodiments of the present invention. For example, the controller 820 may control signal flows among the function blocks to perform the operations described with reference to FIG. 5. In detail, the controller 820 may control the transceiver 810 to transmit to a VPLMN an attach request message including roaming level information mapped to at least one service type that may be received by the UE. If first service type information determined based on an SLA made for providing the subscribers of the HPLMN and VPLMN with a roaming service and the roaming level information is received, the controller 820 may control the transceiver 810 to receive an attach response message including second service type information corresponding to the first service type information from the VPLMN.

The storage unit 830 may store at least one of information transmitted/received by the transceiver 810 or information generated by the controller 820.

Figure 9:
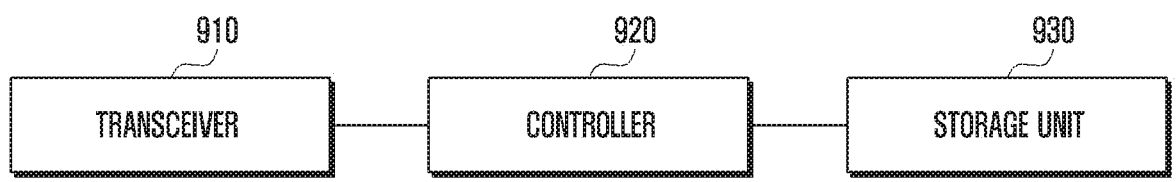
FIG. 9 is a block diagram illustrating a configuration of a VPLMN according to an embodiment of the present invention.

FIG. 9 is a block diagram illustrating a configuration of a VPLMN according to an embodiment of the present invention.

In reference to FIG. 9, the VPLMN may include a transceiver 910, a controller 920, and a storage unit 930. In the present invention, the controller may be defined as a circuit, an application-specific integrated circuit, or at least one processor.

The transceiver 910 may transmit/receive signals to and from a UE or another network entity.

The controller 920 may control overall operations of the VPLMN according to embodiments of the present invention. For example, the controller 920 may control signal flows among the function blocks to perform the operations described with reference to FIG. 5. In detail, the controller 920 may control the transceiver 910 to receive an attach request message, including roaming level information mapped to at least one service type that may be received by the UE, from the UE.

The controller 920 may control the transceiver 9210 to receive first service type information determined based on an SLA made for providing the subscribers of the HPLMN and VPLMN with a roaming service and the roaming level information from the HPLMN.

The controller 920 may control the transceiver to transmit an attach response message including second service type information corresponding to the first service type information to the UE.

The storage unit 930 may store at least one of information transmitted/received by the transceiver 910 and information generated by the controller 920.

Figure 10:
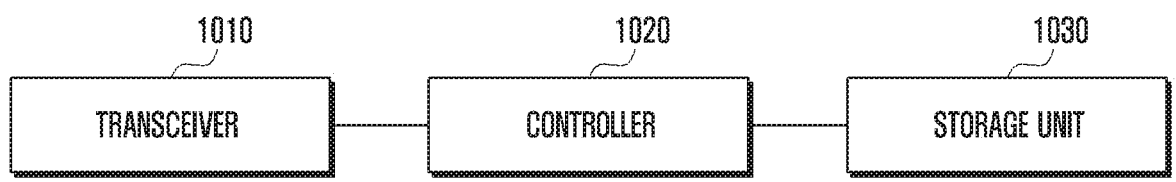
FIG. 10 is a block diagram illustrating a configuration of a HPLMN according to an embodiment of the present invention.

FIG. 10 is a block diagram illustrating a configuration of a HPLMN according to an embodiment of the present invention.

In reference to FIG. 10, the HPLMN may include a transceiver 1010, a controller 1020, and a storage unit 1030. In the present invention, the controller may be defined as a circuit, an application-specific integrated circuit, or at least one processor.

The transceiver 1010 may transmit/receive signals to and from a UE or another network entity.

The controller 1020 may control overall operations of the VPLMN according to embodiments of the present invention. For example, the controller 1020 may control signal flows among the function blocks to perform the operations described with reference to FIG. 5. In detail, the controller 1020 may control the transceiver 1010 to receive a service request message, including roaming level information mapped to at least one service type that may be received by the UE and a UE identifier of the UE, from a VPLMN.

The controller 1020 may determine first service type information based on an SLA made for providing the subscribers of the HPLMN and VPLMN with a roaming service and the roaming level information from the HPLMN. The controller 1020 may control the transceiver 1010 to transmit a service response message including the first service type information to the VPLMN.

The storage unit 1030 may store at least one of information transmitted/received by the transceiver 1010 and information generated by the controller 1020.

The invention claimed is:

1. A method performed by a terminal in a wireless communication system, the method comprising:
   transmitting, to a first network entity for mobility management associated with a visited public land mobile network (PLMN), an attach request message including first information associated with at least one service type for the visited PLMN requested by the terminal and an identity of a home PLMN; and
   receiving, from the first network entity, an attach response message including second information associated with a service type allowed by the visited PLMN and third information for mapping between the service type allowed by the visited PLMN and a service type subscribed in the home PLMN,
   wherein a service level agreement (SLA) is associated with a roaming service between the visited PLMN and the home PLMN, and
   wherein the second information and the third information are determined based on the first information and the SLA.

2. The method of claim 1, wherein the service type includes a network slice type.

3. The method of claim 1, wherein the attach request message further includes a terminal identifier.

4. A method performed by a first network entity for mobility management associated with a visited public land mobile network (PLMN) in a wireless communication system, the method comprising:
   receiving, from a terminal, an attach request message including first information associated with at least one service type for the visited PLMN requested by the terminal and an identity of a home PLMN;
   transmitting, to a second network entity associated with selecting the at least one service type, a request message including the first information associated with the service type for the visited PLMN requested by the terminal;
   receiving, from the second network entity, a response message including second information associated with a service type allowed by the visited PLMN among the at least one service type for the visited PLMN requested by the terminal and third information for mapping between the service type allowed by the visited PLMN and a service type subscribed in the home PLMN; and
   transmitting, to the terminal, an attach response message including the second information associated with the service type allowed by the visited PLMN and the third information,
   wherein a service level agreement (SLA) is associated with a roaming service between the visited PLMN and the home PLMN, and
   wherein the second information and the third information are determined based on the first information and the SLA.

5. The method of claim 4, wherein the service type includes a network slice type.

6. The method of claim 4, wherein the attach request message further includes a terminal identifier.

7. A terminal in a wireless communication system, the terminal comprising:
   a transceiver; and
   a processor configured to:
   transmit, to a first network entity for mobility management associated with a visited public land mobile network (PLMN) via the transceiver, an attach request message including first information associated with at least one service type for the visited PLMN requested by the terminal and an identity of a home PLMN, and
   receive, from the first network entity via the transceiver, an attach response message including second information associated with a service type allowed by the visited PLMN and third information for mapping between the service type allowed by the visited PLMN and a service type subscribed in the home PLMN,
   wherein a service level agreement (SLA) is associated with a roaming service between the visited PLMN and the home PLMN, and
   wherein the second information and the third information are determined based on the first information and the SLA.

8. The terminal of claim 7, wherein the service type includes a network slice type.

9. The terminal of claim 7, wherein the attach request message further includes a terminal identifier.

10. A first network entity for mobility management associated with a visited public land mobile network (PLMN) in a wireless communication system, the first network entity comprising:
    a transceiver; and
    a processor configured to:
    receive, from a terminal via the transceiver, an attach request message including first information associated with at least one service type for the visited PLMN requested by the terminal and an identity of a home PLMN,
    transmit, to a second network entity associated with selecting the at least one service type via the transceiver, a request message including the first information associated with the service type for the visited PLMN requested by the terminal,
    receive, from the second network entity via the transceiver, a response message including second information associated with a service type allowed by the visited PLMN among the at least one service type for the visited PLMN requested by the terminal and third information for mapping between the service type allowed by the visited PLMN and a service type subscribed in the home PLMN, and
    transmit, to the terminal via the transceiver, an attach response message including the second information associated with the service type allowed by the visited PLMN and the third information,
    wherein a service level agreement (SLA) is associated with a roaming service between the visited PLMN and the home PLMN, and
    wherein the second information and the third information are determined based on the first information and the SLA.

11. The first network entity of claim 10, wherein the service type includes a network slice type.

12. The first network entity of claim 10, wherein the attach request message further includes a terminal identifier.

* * * * *